(12) United States Patent
Olivieri et al.

(10) Patent No.: US 6,427,420 B1
(45) Date of Patent: Aug. 6, 2002

(54) METHOD FOR THE MANUFACTURE OF A LASER-PRECUT PACK AND PACK

(75) Inventors: Alain Olivieri, Olivet; Vincent Ferry, Orléans; Daniel Blanchard, Neuvy-en Sullias; Jean-François Lefebvre, Olivet, all of (FR)

(73) Assignee: Unisabi (FR)

( * ) Notice: Subject to any disclaimer, the term of this patent is extended or adjusted under 35 U.S.C. 154(b) by 0 days.

(21) Appl. No.: 09/331,975

(22) PCT Filed: Dec. 31, 1997

(86) PCT No.: PCT/IB97/01609

§ 371 (c)(1),
(2), (4) Date: Aug. 30, 1999

(87) PCT Pub. No.: WO98/29312

PCT Pub. Date: Jul. 9, 1998

(30) Foreign Application Priority Data

Dec. 31, 1996 (FR) .............................................. 96 16284

(51) Int. Cl.[7] .............................................. B65B 61/18
(52) U.S. Cl. .............................. 53/412; 53/452; 53/455; 53/133.8; 493/212
(58) Field of Search ......................... 53/412, 452, 455, 53/469, 133.8, 133.7, 133.6, 133.5; 493/212, 341, 930, 963; 83/883, 885, 171, 879; 219/121.69, 121.71; 206/484, 469

(56) References Cited

U.S. PATENT DOCUMENTS

| 3,909,582 | A | * | 9/1975 | Bowen | 219/121.69 |
| 4,549,063 | A | * | 10/1985 | Ang et al. | 219/121.71 |
| 5,630,308 | A | * | 5/1997 | Guckenberger | 53/412 |

FOREIGN PATENT DOCUMENTS

| EP | 0473517 A | 3/1992 |
| FR | 2728242 | 6/1996 |

\* cited by examiner

Primary Examiner—Rinaldi I. Rada
Assistant Examiner—Sameh Tawfik
(74) Attorney, Agent, or Firm—Dorsey & Whitney LLP

(57) ABSTRACT

The invention relates to a method for the manufacture of a pack, particularly intended for undergoing preservation treatment, from at least one film (10) comprising two plastic layers, an upper (11) and a lower (12), which form the outer and inner faces of said pack, and a light-metal central layer (13) sandwiched between said upper and lower layers. According to the invention, prior to the operations to make said pack, a laser beam is applied solely to the lower layer of said film, said lower layer forming the inner face of said pack, in order to produce, virtually in the entire thickness of said lower layer, at least one perforation (14) forming at least one precut line.

26 Claims, 6 Drawing Sheets

Figure 1A:
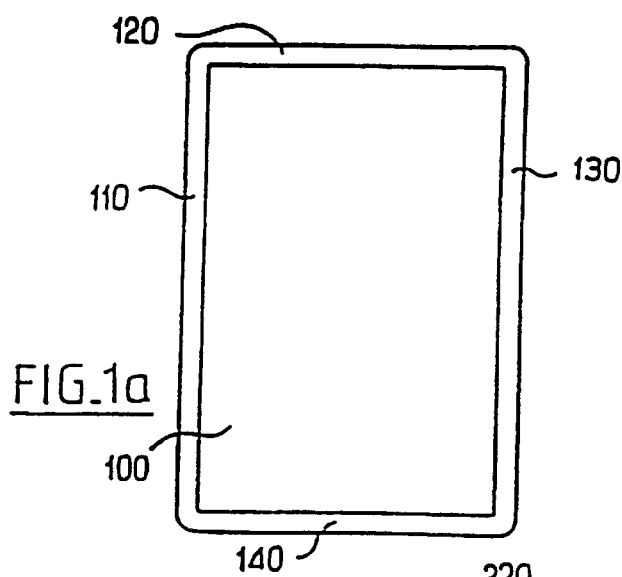

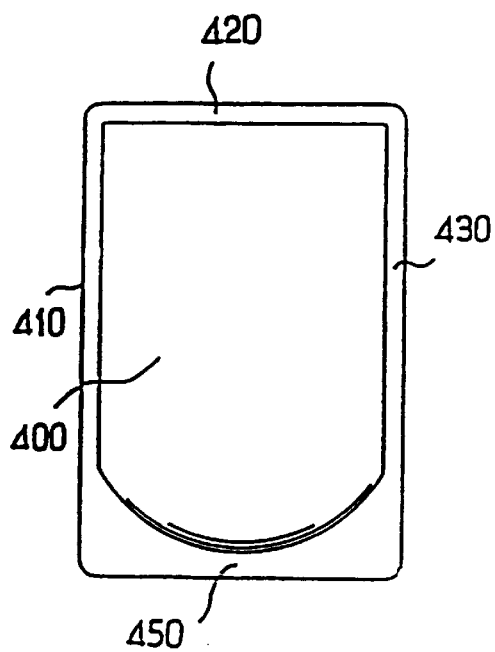
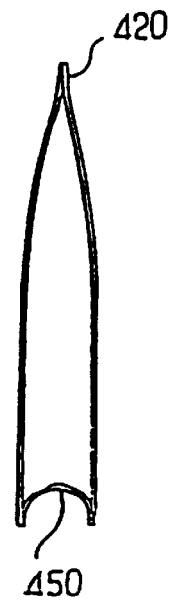
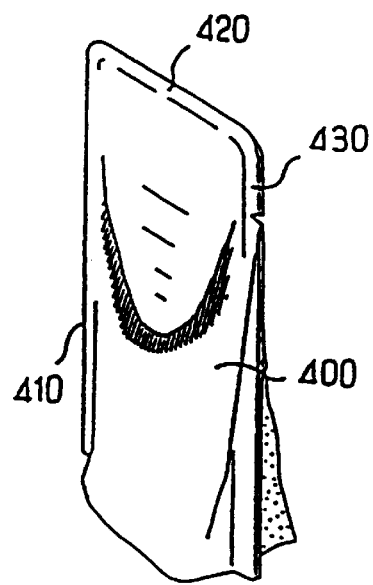
FIG_4a  FIG_4b  FIG_4c
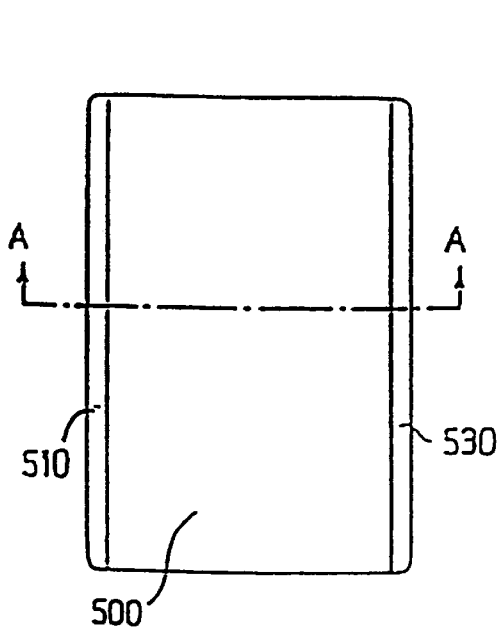
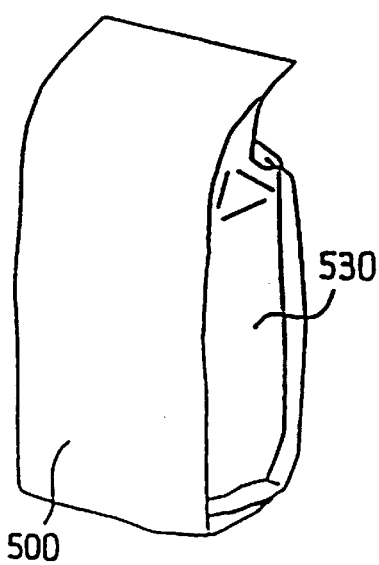
FIG_5a  FIG_5b  FIG_5c

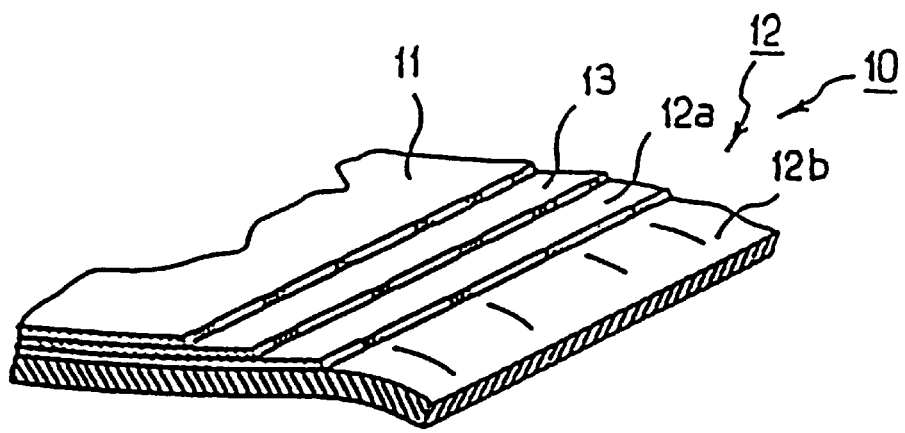
FIG_6
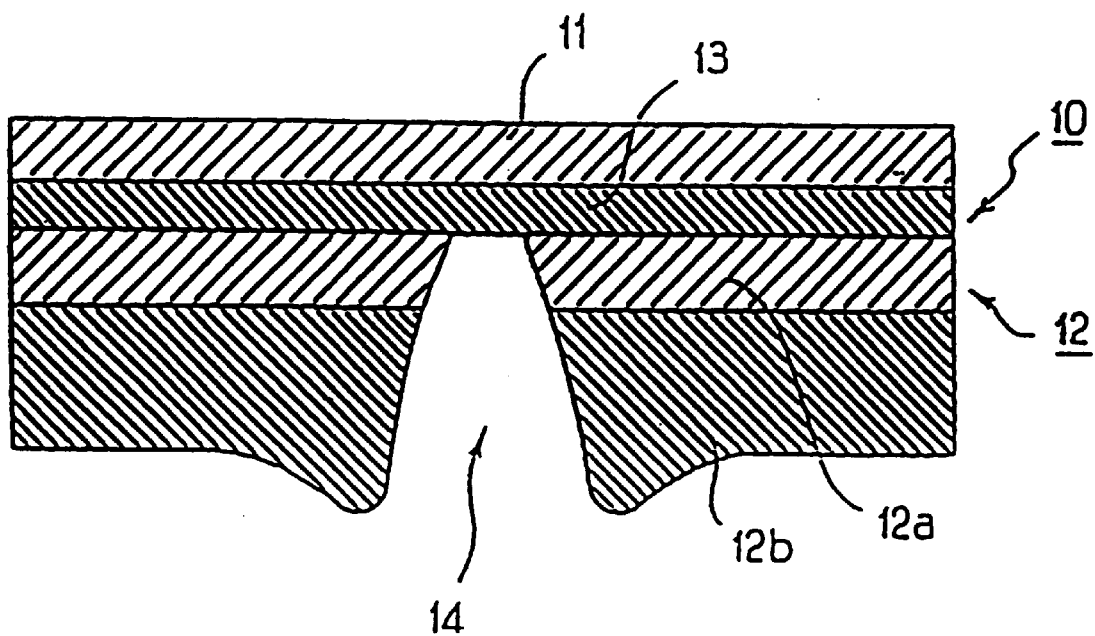
FIG_7

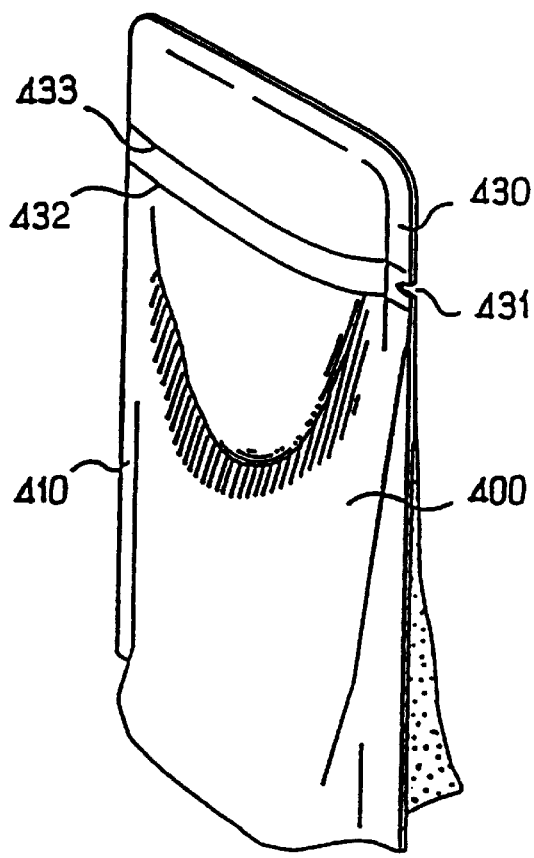 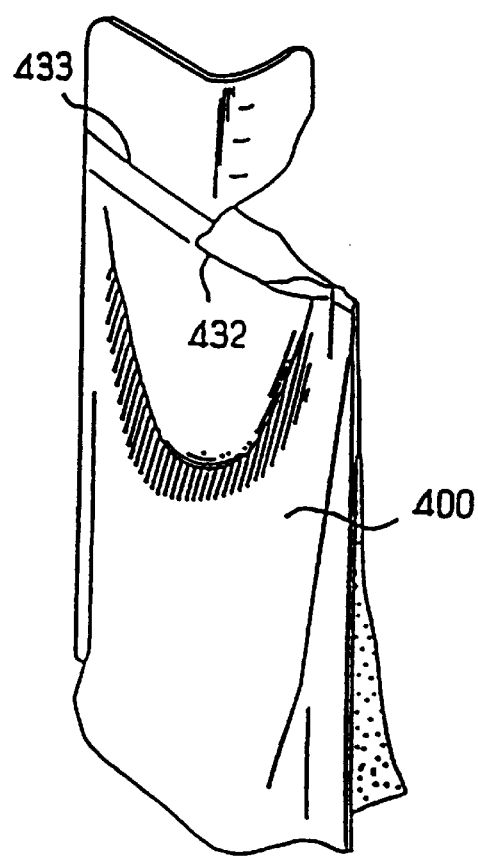
FIG_8a  FIG_8b
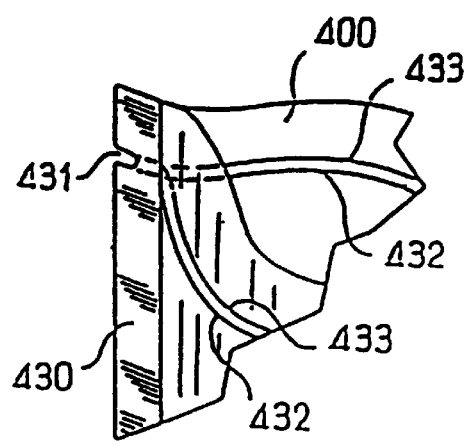 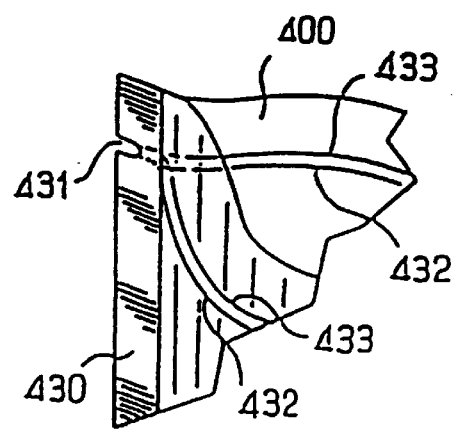
FIG_9a  FIG_9b

METHOD FOR THE MANUFACTURE OF A LASER-PRECUT PACK AND PACK

BACKGROUND OF THE INVENTION

1. Field of the Invention

The present invention relates to a method for the manufacture of a pack, particularly intended for undergoing preservation treatment, from at least one film comprising two plastic layers, an upper and a lower, which form the outer and inner faces of the said pack, and a light-metal central layer sandwiched between the said upper and lower layers.

It also relates to a flexible pack, particularly intended for undergoing preservation treatment, especially after it has been filled and closed, comprising two flanks connected at their lateral edges, each flank comprising plastic inner and outer faces and a light-metal central layer sandwiched between the two inner and outer faces, the said pack being produced particularly by such a method.

The invention is used especially advantageously in the production of pouches or bags containing food substances, particularly food substances for animals, such pouches or bags being intended to be closed hermetically by welding and treated thermally after being filled and closed.

2. Description of the Prior Art

At the present time, such packs have various forms.

They may be flat with three or four welds or gusseted with three welded sides or three welded sides and a gusset-shaped welded bottom.

Such packs may also comprise two lateral gussets or two gussets positioned at the top and bottom of the pack with welded lateral edges.

These packs may be sterilized by being heated in a humid atmosphere or under pressure.

In order to withstand such thermal treatment, they are produced from one or more films having a special structure.

More especially, they are usually manufactured from one or more films, each film comprising an upper layer and a lower layer which are intended for forming the outer and inner faces of the said packs, the said outer and inner faces being produced from plastic, and a central layer sandwiched between the said upper and lower layers, the said central layer being produced from light metal.

In general, the upper layer is a polyethylene terephthalate layer combined or not with a polyamide layer. The central layer is produced from aluminium and the lower layer is a polypropylene layer combined or not with a polyamide layer.

Between each layer is provided an adhesive coating making it possible to connect the various layers to one another.

Moreover, the polyethylene terephthalate layer may be printed on its inner face.

The polyethylene terephthalate layer serves generally as a printing support and gives the packet's external appearance.

The aluminium central layer forms a barrier to gas, particularly to oxygen and steam, so as to insulate from outside the substances which are contained within the pack.

The polyamide layer forms an anti-perforation layer, when this is necessary in accordance with the subsequent uses of the pack, and the polypropylene layer serves as a welding agent for making the pack, gives the pack general mechanical stability and ensures sealing at the welds of the said pack.

Such packs may contain solids of a moist nature, liquids or else a combination of solid and liquid.

Some packs may comprise a start-off-tear notch on their lateral edges. In this case, this notch is made in a lateral weld of the pack that makes it possible to open the latter by tearing.

These already known packs have some disadvantages, particularly with regard to the method of opening them.

In fact, it is not very practical to use a cutting tool of the type of a pair of scissors or a knife, since, for example, this tool may be soiled by the product contained within the pack.

When the pack can be opened by tearing, started with the aid of a start-off-tear notch, the tearing force has to be relatively great and sometimes makes it necessary to employ a tool.

In fact, the tearing force of a multi-layer film usually depends on the tearing force of the materials forming the pack and on the adhesive force between the various layers forming the said pack, and these forces may be adversely affected after the latter has undergone preservation treatment.

The tearing direction is generally propagated in the flanks of the pack in a non-oriented manner. Thus, either partial opening of the pack is obtained, or there is a tear below the level of the product contained in the pack, thereby causing this product to flow out undesirably.

In order to attempt to overcome the above-mentioned disadvantages, mainly regarding the opening of these packs, packs have already been provided which comprise on the outer faces of their flanks a precut made by laser.

Such packs are described, in particular, in the documents EP-540,184, EP-473,517, U.S. Pat. No. 5,158,499 and U.S. Pat. No. 5,630,308.

However, the main disadvantage of this precut, carried out by applying a laser beam to the outer face of the flanks of the pack, is that it adversely affects the external appearance of the pack, once the latter has been produced.

Moreover, document U.S. Pat. No. 5,000,321 discloses a pack which comprises on its outer and inner faces weakening zones which are produced by means of a laser beam. These weakened zones are obtained by thinning the layers forming the outer and inner faces of the said pack.

However, such a system is not entirely satisfactory, since the weakening of the layers forming the outer and inner faces of the pack may be insufficient to bring about an exact and directed opening of the pack.

SUMMARY OF THE INVENTION

The present invention, then, provides a new method for the manufacture of a pack, particularly intended for undergoing preservation treatment, which makes it possible to produce a pack having easy and guided opening over its entire width.

More especially, according to the invention, there is provided a method for the manufacture of a pack, particularly intended for undergoing preservation treatment, from at least one film comprising two plastic layers, an upper and a lower, which form the outer and inner faces of the said pack, and a light-metal central layer sandwiched between the said upper and lower layers. It is characterized in that, prior to the operations to make the said pack, a laser beam is applied solely to the lower layer of the said film, the said lower layer forming the inner face of the said pack, in order to produce, virtually in the entire thickness of the said lower layer, at least one perforation forming at least one precut line.

Within the scope of the present invention, by preservation treatment will be meant any treatment known to the average person skilled in the art, especially thermal treatments, such as conventional sterilization, flash sterilization and pasteurization.

Thus, according to the invention, the lower film layer forming the inner face of the pack is embrittled along a defined line by the application of a laser beam. The laser beam is absorbed by the plastics forming the lower layer of the film and is reflected totally by the light-metal central layer. In the region of the impact of the incident beam, the materials are heated, melt and evaporate. This results in a perforation of the lower layer as far as the light-metal layer along the laser beam application line.

When the pack produced according to the manufacturing method is opened, the tear is propagated along the precut line thus made and continues along this line over the entire width of the pack.

Directed and exact opening of the pack is thus obtained.

According to one embodiment of the method according to the invention, each perforation is a continuous perforation which extends over part of the width of the film.

According to another preferred embodiment of the method according to the invention, each perforation is a succession of micro-perforations forming a precut line.

The perforation on the lower film layer forming the inner face of the pack advantageously makes it possible to avoid adversely affecting the central layer and the outer face of the pack and to maintain the long-term sterilization performances of the pack thus produced.

The production of micro-perforations in the form of dots makes it possible to avoid adversely affecting the strength of the pack thus produced.

Moreover, the production of micro-perforations in the form of dots makes it possible to protect the light-metal central layer.

In fact, a continuous perforation over the entire width of the film would subsequently make it possible to fold the film along the precut line, and this would result in the light-metal central layer breaking by exceeding the limit of elasticity of this layer, the consequence of this being a loss of efficiency of this central layer which has to form a barrier to oxygen and water vapours, and a risk of subsequent perforation of the multi-layer film, from which the pack is produced.

According to the preferred embodiment of the method according to the invention, by which at least one succession of micro-perforations having at least one precut line is produced in the entire thickness of the lower layer of the film, there may be provision for this precut line to be made over the entire width of the film.

Alternatively, each precut line may be made only over part of the width of the film, leaving free of micro-perforations the two longitudinal edges of the film which are intended to be welded in order to make the said pack.

If each precut line extends over the entire width of the film, the fact that this precut line consists of micro-perforations in the form of a line of dots makes it possible, by virtue of its interrupted nature at microscopic level, to carry out sealing welding of the edges of the film in order to produce the pack.

The variant, according to which the precut line is produced by means of micro-perforations in the form of a line of dots over only part of the width of the film, leaving the two longitudinal edges of the film free of micro-perforations, is intended more especially for when the materials forming the lower layer of the film require a density of micro-perforations such that the sealing of the welds produced on the longitudinal edges of the film can no longer be ensured.

Thus, in this case, it is preferable for the precut line not to extend in the region of the edges, so that the welds subsequently made are not affected by the precut, and the sealing of the pack is maintained.

According to a variant of the method according to the invention, two parallel perforations forming two parallel precut lines slightly spaced from one another are produced simultaneously in the entire thickness of the said lower layer of the film.

These two perforations are advantageously two successions of micro-perforations.

In this case, the spacing between the two parallel precut lines may preferably be approximately between 2 and 5 mm.

In order to produce at least two parallel precut lines simultaneously, a single laser source may be used, combined with an optical device for devising the laser beam coming from the said source into at least two identical beams.

Two laser sources may also be used, supplying two identical laser beams in order to produce the two parallel precut lines simultaneously.

If, according to the invention, a succession of micro-perforations is produced, the density of the micro-perforations is constant over the entire length of each precut line produced and is preferably between 3 and 6 micro-perforations per millimeter.

The power of the laser beam used is set as a function of the characteristics of the materials forming the said film.

Of course, in an embodiment of the method according to the invention, by which the film is wound on reels and fed continuously, the laser beam is then applied, at specific locations on the said film, solely to the lower layer of the latter, in order to produce at each specific location, virtually in the entire thickness of the said lower layer, at least one perforation forming at least one precut line.

Advantageously, this perforation is a succession of micro-perforations forming at least the precut line.

In the method according to the invention, after the step of welding the edges of each pack, a start-off-tear notch may be produced in the latter, the said notch being positioned on at least one lateral edge of the said pack between the two parallel precut lines.

Thus, the start-off tear is made visible by the notch cut in the region of a lateral weld of the pack and is conducive to tearing the materials forming the said pack.

In this case, the tear is first propagated in the weld zone in the direction of the opposite weld of the pack, without its direction being controlled. The tear is then propagated in the pack flank comprising the two parallel precut lines, until it meets one of the two precut lines.

The tear continues along this precut line which guides opening as far as the opposite side of the pack. This results in a rectilinear opening extending from one lateral weld of the pack to the other, making it possible to empty the content of the pack easily.

The invention also provides a flexible pack, particularly intended for undergoing preservation treatment, especially after it has been filled and closed, comprising two flanks connected at their lateral edges, each flank comprising plastic inner and outer faces and a light-metal central layer sandwiched between the two inner and outer faces, characterized in that at least one inner face of the said pack comprises, in its entire thickness, at least one perforation forming at least one precut line located in the upper part of the said pack.

Advantageously, each perforation is a succession of micro-perforations forming a precut line.

As regards a continuous perforation, this extends only over part of the width of the pack.

In an embodiment of the pack according to the present invention, this pack comprising welds on its lateral edges, each precut line consisting of a succession of micro-perforations extends over the entire width of the said pack.

Alternatively, it is conceivable for each precut line to extend over only part of the width of the said pack, being interrupted in the region of its lateral welds.

The pack according to the present invention may, on at least one of its inner faces, comprise two parallel precut lines at a distance of approximately 2 to 5 mm from one another. In this case, it comprises at least one start-off-opening notch located on one of its welded lateral edges between the two parallel precut lines.

Advantageously, the pack according to the present invention comprises on each inner face, in the entire thickness of the inner face, at least one perforation forming at least one precut line.

The central layer of each flank of the said pack according to the present invention is preferably produced from aluminium. The inner face of each flank of the said pack according to the invention comprises a polypropylene layer which may be combined or not with a polyamide layer. The outer face of each flank of the pack according to the invention comprises a polyethylene terephthalate layer combined or not with an additional polyamide layer.

The pack according to the invention is preferably produced by the method according to the invention.

BRIEF DESCRIPTION OF THE INVENTION

The following description, with reference to the accompanying drawings given as non-limiting examples, will make it easy to understand the essence of the invention and how it can be implemented.

Figure 1B:
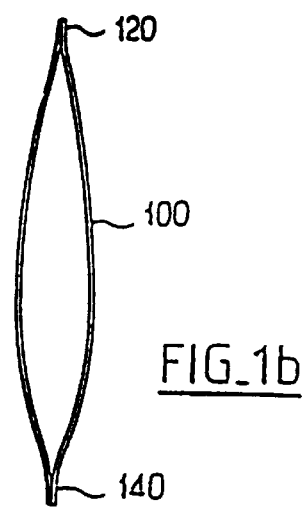
Figure 2A:
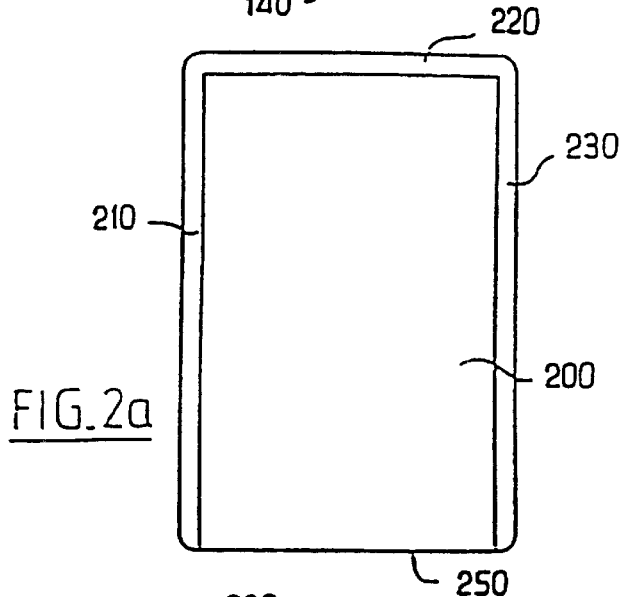
Figure 2B:
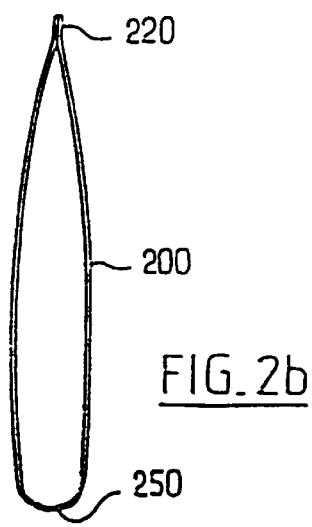
Figure 3A:
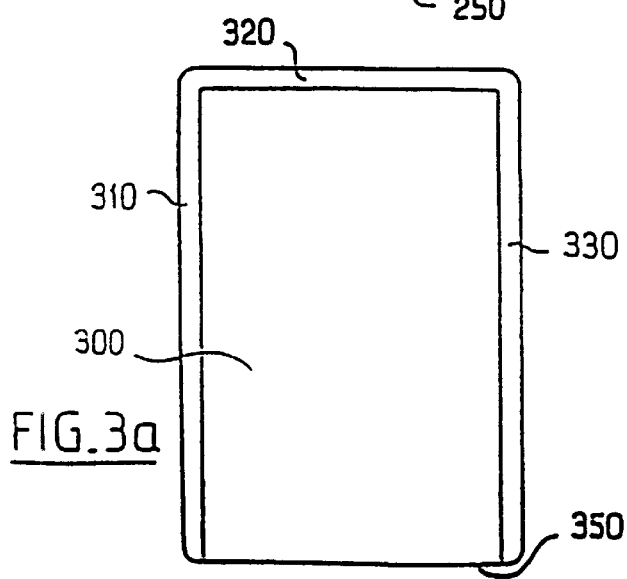
Figure 3B:
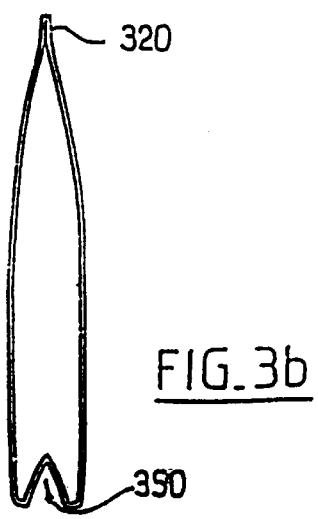
Figure 10:
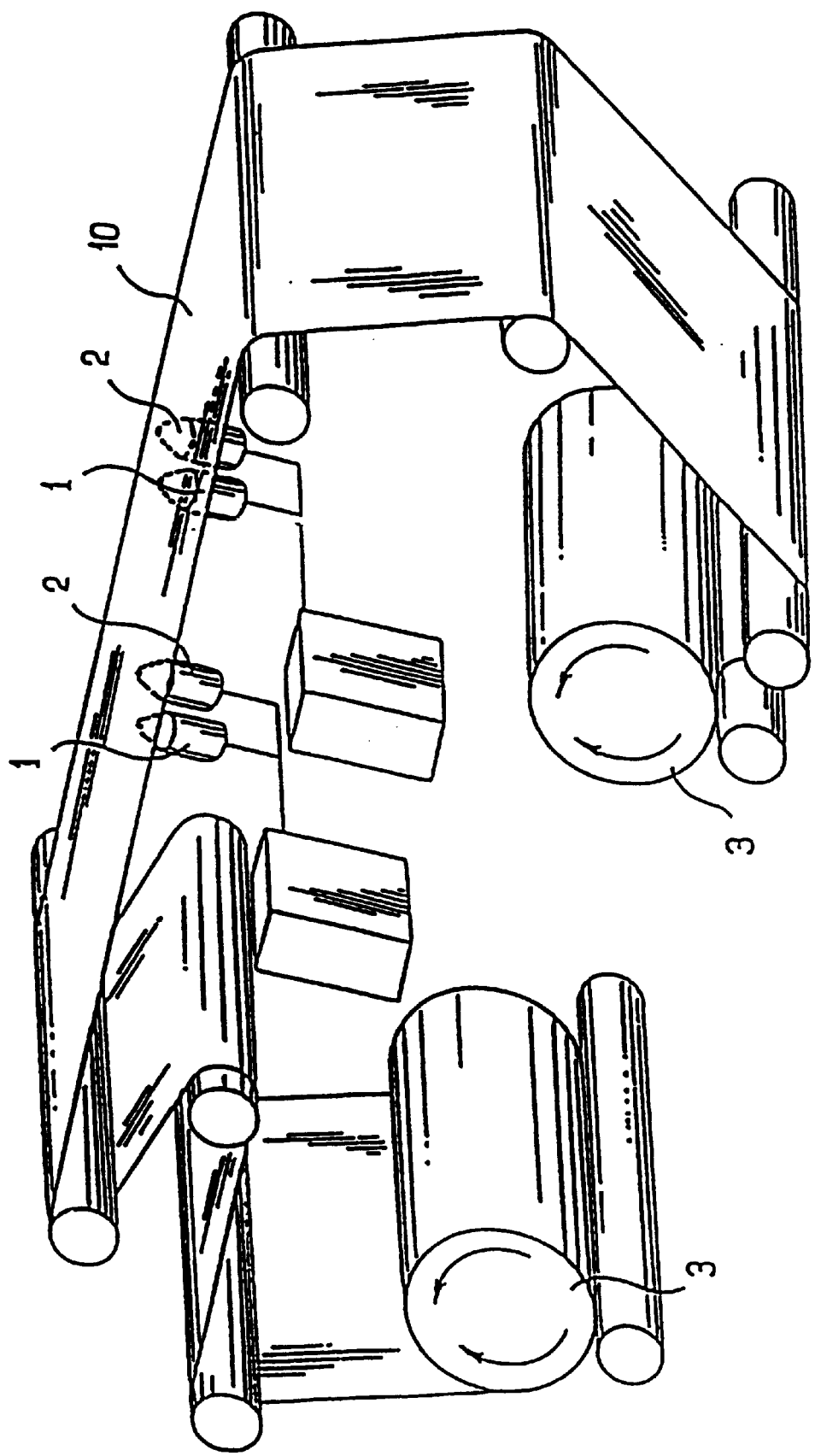
Figure 11:
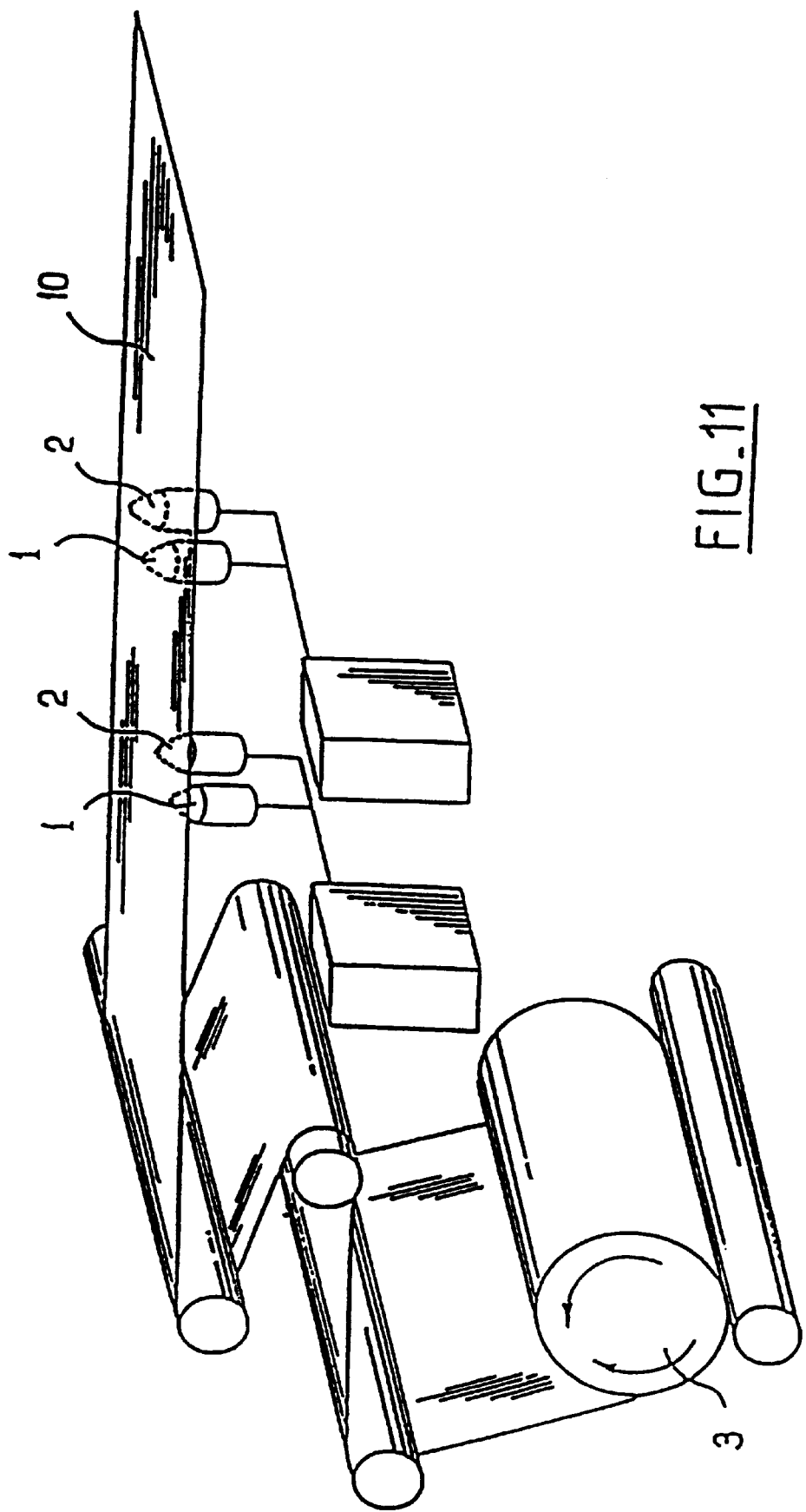

In the accompanying drawings:

FIGS. 1a and 1b are respectively a front view and a sectional side view of a pack of the flat-bag type, FIGS. 2a and 2b are respectively a front view and a sectional side view of another pack of the flat-bag type, FIGS. 3a and 3b show respectively a front view and a sectional side view of a pack of the gusset-bag type, FIGS. 4a, 4b and 4c show respectively a front view, a sectional side view and a three-quarter perspective view of another pack of the gusset-bag type, FIGS. 5a, 5b and 5c show respectively a front view, a view in the plane A—A and a diagrammatic three-quarter perspective view of a pack of the bag type with two lateral gussets, FIG. 6 is a view of a detail of part of a film, from which the pack according to the invention is produced, FIG. 7 is a sectional view of a detail of the film shown in FIG. 6, perforated by the method according to the invention, FIG. 8a is a three-quarter perspective view of an embodiment of a pack according to the invention in the closed state, FIG. 8b is a three-quarter perspective view of the pack of FIG. 8a in the half-opened state, FIG. 9a is a view of a detail of a welded edge of the pack of FIG. 8a, FIG. 9b is a view of a detail of a welded edge of an alternative embodiment of the pack according to the invention, FIG. 10 is a diagrammatic view of an apparatus for carrying out the method according to the invention, FIG. 11 is a diagrammatic view of another apparatus for carrying out the method according to the invention.

DETAILED DESCRIPTION OF THE INVENTION

FIGS. 1a and 1b show a pack 100 taking the form of a pouch or bag closed hermetically by welding.

This pack 100 is a flat bag, that is to say it comprises two flanks welded to one another on the four sides 110, 120, 130, 140.

FIGS. 2a and 2b show another pack 200 of the flat-bag type, which comprises two flanks welded only on three sides 210, 220, 230 out of four. It has a non-welded bottom 250, as shown more especially in FIG. 2b.

FIGS. 3a, 3b, 4a, 4b, 4c and 5a, 5b, 5c show packs 300, 400, 500 of the gusset-bag type.

More especially, FIGS. 3a and 3b show a pack 300 comprising three welded sides 310, 320, 330 and a bottom 350 comprising a gusset made by folding.

FIGS. 4a, 4b and 4c show another type of gusset bag comprising three welded sides 410, 420, 430 and a gusseted bottom 450 produced with two welded parallel edges.

FIGS. 5a, 5b, 5c show a pack 500 which comprises two lateral edges 510, 530 welded so as to produce a gusset on each of the edges 510, 530, as shown more especially in FIGS. 5b and 5c.

These packs 100, 200, 300, 400 and 500, shown respectively in FIGS. 1a to 5c, are intended to be sterilized after they have been filled and closed.

In general, these packs in the form of a bag or pouch are intended for containing food substance, for example food substance for animals.

Thus, they are conventionally produced from materials which must withstand sterilization in a humid atmosphere and under pressure.

More especially, these packs 100, 200, 300, 400 and 500 are produced from one or more films, a portion of which is shown more especially in FIG. 6. As may be seen in this figure, this film 10 comprises three layers 11, 12, 13, namely two plastic layers, an upper 11 and a lower 12, which form the outer and inner faces of the packs, and a light-metal central layer 13 sandwiched between the said upper 11 and lower 12 layers.

According to the embodiment shown in FIG. 6, the upper layer 11 is produced from polyethylene terephthalate, the central layer 13 is made of aluminium and the lower layer 12 forming the inner face of the pack comprises successively a polyamide layer 12a and a polypropylene layer 12b.

The polyethylene terephthalate forming the layer providing the outer face of the pack serves as a printing support and makes it possible to give the pack thus produced its external appearance, for example a shiny or dull appearance.

The central layer 13 produced from aluminium forms a barrier to external gas, particularly to oxygen and water vapour, so as to insulate effectively the food substance contained in the pack.

The first layer 12a of the lower layer 12 of the film 10 is produced, here, from polyamide which makes it possible to reinforce the pack mechanically and avoid perforations from outside. The second layer 12b made of polypropylene serves as a welding agent to allow the welding of the edges of the pack. The polypropylene gives the pack some mechanical stability and ensures good sealing of the welds.

In general terms, the polyethylene terephthalate layer has a thickness of approximately between 10 and 20 $\mu$m, the polyamide layer has a thickness likewise of between 10 and 20 $\mu$m, the aluminium central layer has a thickness of approximately between 7 and 12 $\mu$m and the polypropylene layer has a thickness of between 30 and 100 $\mu$m.

Of course, there may be provision for the upper film layer forming the outer face of the flanks of the pack to comprise a succession of two layers, namely an outer polyethylene terephthalate layer and an inner polyamide layer, for the central layer still to be made of aluminium and for the lower layer forming the inner face of the flanks of the said pack then to be produced only from polypropylene.

Provision may also be made, according to another variant, for the outer film layer forming the outer face of the pack to be produced from polyethylene terephthalate, for the central layer to be made of aluminium and for the lower film layer forming the inner face of the pack to be produced only from polypropylene.

An adhesive coating is provided between each layer of the said film 10, in order to make it possible to fix the said layers forming the said film to one another.

Moreover, there may also be provision for the inner face of the polyethylene terephthalate layer to be printed.

According to the invention, in the method for the manufacture of a pack of the types shown, for example, in FIGS. 1a, 1b, 2a, 2b, 3a, 3b, 4a, 4b, 4c and 5a, 5b, 5c, from one or more films of the type shown in FIG. 6, prior to the actual operations to make the said pack, a laser beam is applied solely to the lower layer of the said film, the said lower layer forming the inner face of the said pack, in order to produce, in the entire thickness of the said lower layer, at least one perforation forming at least one precut line.

The laser beam used has a power of approximately 200 watts, and the diameter of the laser beam focused at the point of incidence on the film is approximately 1/10 of a millimeter.

Thus, when at least one precut line is being produced, the laser beam is absorbed by the plastics forming the lower layer 12, here polyamide and polypropylene, and is reflected totally by the aluminium central layer 13.

In the region of the impact of the incident laser beam, the plastics are heated, melt and evaporate. This results in a perforation of the plastic layers as far as the aluminium layer along the laser beam application line.

In an embodiment of the manufacturing method according to the invention, there may be provision for this perforation to extend continuously over only part of the width of the film, subsequently forming the width of the said pack.

Preferably, at least one succession of micro-perforations forming at least one precut line is produced by applying a pulsed laser beam solely to the lower layer.

FIG. 7 shows a sectional view of a micro-perforation 14.

As shown more especially in FIG. 7, in the method according to the invention the perforation 14 extends in depth over the entire thickness of the lower film layer 12 which, here, consists of the polyamide layer 12a and the polypropylene layer 12b.

The density of the micro-perforations is equal over the length of the precut line, preferably of the order of 3 to 6 micro-perforations per precut millimeter. This is carried out, in the method according to the invention, by synchronizing the operation of the laser beam (pulsation frequency) as a function of the advance of the film.

FIGS. 8a and 8b show more especially a pack according to the invention of the gusset-bag type, shown in FIGS. 4a, 4b and 4c, with three welded sides and a gusset formed in its bottom.

As shown in FIG. 8a, this pack 400 comprises in its upper part, on each inner face of its flanks, two parallel precut lines 432, 433 slightly spaced from one another.

In the method according to the invention, this may be carried out simultaneously in the entire thickness of the said lower film layer, from which the pack is manufactured.

In particular, the laser beam is applied to the said lower layer of the said film in order, then, to produce two successions of parallel micro-perforations forming the said parallel precut lines slightly spaced from one another. The spacing between the two parallel precut lines is approximately between 2 and 5 mm.

In the embodiment illustrated, each inner face of the flanks of the pack 400 comprises the two precut lines 432, 433, but there may also be provision for only a single inner face to comprise the two parallel precut lines.

According to one embodiment, the precut line extends over the entire width of the film, that is to say the entire width of the pack, as shown more especially in FIG. 8a and in detail in FIG. 9a.

Thus, as these figures show, the precut lines extend on the welded edges 430, 410 of the said pack 400.

According to a variant shown more especially in FIG. 9b, there may be provision, when the method according to the invention is being implemented, for producing each precut line over only part of the width of the film, that is to say part of the width of the pack, leaving free of micro-perforations the two longitudinal edges 430 of the film which are intended to be welded in order to make the said pack.

Thus, as shown in FIG. 9a, each precut line extends over part of the width of the said pack 400, being interrupted in the region of the lateral welds 430 of the latter.

In the method according to the invention, the interruption of each precut line may be managed either by taking the printing of the film as a reference when the laser beam is applied to the lower layer of the latter or by synchronizing the operation of the laser beam with the displacement of the said film.

As shown in FIGS. 8a, 9a and 9b, there may be provision, according to the invention, for at least one welded lateral edge 430 of the pack 430 to comprise a start-off-opening notch 431 located between two precut lines.

According to the embodiment shown in FIG. 9a, the precut lines 432, 433, originate directly from the start-off-opening notch 431, whereas, according to the embodiment shown in FIG. 9b, the precut lines 432, 433 originate from the welded edge 430, and there is therefore a non-precut interval between the start-off-opening notch 431 and the precut lines 432, 433.

The start-off-opening notch 431 is conducive to tearing the materials forming the pack.

More especially, the tear started at the start-off-opening notch 431 is propagated in the weld zone 430 in the direction of the opposite weld 410. This tear is propagated on each of the flanks of the pack until it meets one of the two precut lines 432 or 433 provided on the inner face of each flank of the pack.

The tear then continues along this precut line and guides the opening of the said pack as far as the opposite side, as shown more especially in FIG. 8b.

It has been possible for tests to show that, by virtue of the precut lines consisting of the successions of micro-perforations produced by applying a laser beam to the lower layer of the film from which the pack is produced, a material deemed to have a low tearing force of the order of 4 Newton is opened along a perfectly rectilinear line from one lateral weld to the other in 98% of cases.

When the material has a mean tearing force of the order of 8 Newton, by virtue of the precut line produced by the method according to the invention, the tearing force of the material is lower, of the order of 5 Newton only, and opening likewise takes place along a perfectly rectilinear line, as shown more especially in FIG. 8b.

Finally, when the material forming the flanks of the pack is deemed to have an acceptable tearing force, but exhibits variations in adhesive force between the layers forming it (tearing force of the order of 20 to 80 Newton), the tearing force with the precut line has acceptable levels of the order of 8 Newton and opening likewise takes place along a perfectly rectilinear line.

In the method according to the invention, as shown more especially in FIG. 10, the laser beam may be applied to a film which is wound on reels 3 and which is fed continuously for the purpose of manufacturing several packs.

In this case, the laser beam 1, 2 is applied, at specific locations on the film, solely to the lower layer of the latter, in order to produce at each specific location on the said film 10, in the entire thickness of the said lower layer, at least one succession of micro-perforations or a single continuous perforation, forming at least one precut line.

As shown on the film 10, the film, once precut at a plurality of specific locations, will be wound on a reel 3 in order to be used subsequently on packaging machines or machines for manufacturing empty packs.

There may also be provision, as shown more especially in FIG. 11, for producing these precut lines directly on the packaging machine or the machine for manufacturing empty packs, between the operation of unwinding the film reels 3 and the welding of the sides of the packs.

The production of a plurality of parallel precut lines slightly spaced from one another, more especially two precut lines slightly spaced from one another, as in the case of the pack of FIGS. 8a and 8b, may be carried out according to the invention by using a laser source combined with an optical apparatus which makes it possible to divide the laser beam coming from the source into at least two identical beams.

As shown in FIGS. 10 and 11, a plurality of laser sources 1, 2 may also be used, these supplying identical and parallel laser beams, making it possible to produce the successions of micro-perforations or the continuous perforation making the precut.

Of course, the laser beam used has a power which is set as a function of the characteristics of the materials forming the film.

In general, a $CO_2$ laser will be used, but other lasers may be used within the scope of the method according to the present invention.

It is also conceivable, within the scope of the method according to the present invention, to produce precut lines on all types of bag, particularly on the ones shown in FIGS. 1a to 5c.

The present invention is in no way limited to the embodiments described and shown, but the average person skilled in the art will be able to provide any variant according to its spirit.

In particular, there may be provision, according to the invention, for manufacturing each pack from a film taking the form of one or more individual sheets, to the lower layer of which a laser beam is applied, prior to the actual operations to make the pack, in order to produce at least one perforation forming at least one precut line.

What is claimed is:

1. A method for manufacturing a pack comprising a film having an upper plastic layer for forming an outer surface of said pack, a lower plastic layer for forming an inner surface of said pack, and a central light-metal layer positioned between said upper and said lower plastic layers, said method comprising the steps of:
   a. applying a laser beam to said lower plastic layer prior to forming said pack to produce a perforation forming a pre-cut line only in said lower plastic layer;
   b. forming said pack by welding a substantial portion of the edges of said film together, the remaining portion of unwelded edges forming an opening for filling said pack with contest;
   c. filling said pack with contents; and
   d. sealing said pack by welding the remaining portion of the edges together.

2. The method according to claim 1, wherein said perforation is a continuous and extends over a portion of the width of said film.

3. The method according to claim 1, wherein said perforation is a succession of micro-perforations forming a precut line.

4. The method according to claim 3, wherein said precut line is produced over the entire width of the film.

5. The method according to claim 3, wherein said precut line is produced over a portion of the width of said film.

6. The method according to claim 3, wherein said succession of micro-perforations has a density which is constant over the entire length of each precut line and is approximately between 3 and 6 micro-perforations per millimeter.

7. The method according to claim 1, wherein two parallel perforations forming two parallel precut lines spaced apart from one another are produced simultaneously in substantially the entire thickness of said lower plastic layer.

8. The method according to claim 7, wherein two laser sources are provided for supplying two identical laser beams to produce said parallel precut lines simultaneously.

9. The method according to claim 7, wherein a single laser source is provided and combined with an optical apparatus which divides said laser beam into at least two identical beams to produce said parallel precut lines simultaneously.

10. The method according to claim 7, wherein the spacing between said parallel precut lines is approximately between 2 and 5 mm.

11. The method according to claim 7, wherein after welding said edges of said pack, a start-off-tear notch is produced on at least one lateral edge of said pack between said parallel precut lines.

12. The method according to claim 1, wherein the power of a laser beam is set as a function of the characteristics of the materials forming said film.

13. The method according to claim 1, wherein the film is wound on a reel for continuous feeding to a laser beam, said laser beam being applied at specific locations on said lower plastic layer to produce at each specific location substantially in the entire thickness of said lower plastic layer a perforation forming a precut line.

14. A flexible pack comprising two flanks connected at their lateral edges, each flank having plastic inner and outer surfaces and a light-metal central layer sandwiched between said inner and outer surface, only said at least one inner surface of said pack including a perforation substantially through its entire thickness forming a precut line positioned in the upper inner portion of said pack.

15. The pack according to claim 14, wherein said perforation is a continuous perforation extending over a portion of the width of said pack.

16. The pack according to claim 14, wherein said perforation is a succession of micro-perforations forming a precut line.

17. The pack according to claim 16, further comprising welds on said lateral edges, wherein said precut line extends over the entire width of the said pack.

18. The pack according to claim 16, further comprising welds on said lateral edges, wherein said precut line extends over a portion of the width of said pack, and interrupted in the region of its lateral welds.

19. The pack according to claim 14, wherein one inner surface of said pack comprises two parallel precut lines spaced apart approximately 2 to 5 millimeters.

20. The pack according to claim 19, further comprising start-off-opening notch positioned on one of said welded lateral edges between said two parallel precut lines.

21. The pack according to claim 14, wherein each said inner surface of said pack comprises, substantially in the entire thickness, a perforation forming a precut line.

22. The pack according to claim 14, wherein said central layer of each flank is produced from aluminum.

23. The pack according to one of claim 14, wherein said inner surface of each flank comprises a polypropylene layer.

24. The pack according to claim 14, wherein said inner surface of each flank comprises a polyamide layer and a polypropylene layer.

25. The pack according to claim 14, wherein said outer surfaces of each flank comprises a polyethylene terephthalate layer.

26. The pack according to claim 25, wherein said outer surface of each flank comprises an additional polyamide layer.

* * * * *